United States Patent
Kirby et al.

(10) Patent No.: US 11,648,807 B2
(45) Date of Patent: May 16, 2023

(54) POST-CURE RUN-FLAT AND/OR NOISE REDUCTION APPARATUS AND METHOD OF MANUFACTURING THE SAME

(71) Applicant: Bridgestone Americas Tire Operations, LLC, Nashville, TN (US)

(72) Inventors: James M. Kirby, Akron, OH (US); David J. Zemla, Canal Fulton, OH (US); Bradley S. Plotner, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 396 days.

(21) Appl. No.: 16/311,314

(22) PCT Filed: Jul. 6, 2017

(86) PCT No.: PCT/US2017/040824
§ 371 (c)(1),
(2) Date: Dec. 19, 2018

(87) PCT Pub. No.: WO2018/009607
PCT Pub. Date: Jan. 11, 2018

(65) Prior Publication Data
US 2019/0232732 A1    Aug. 1, 2019

Related U.S. Application Data

(60) Provisional application No. 62/358,623, filed on Jul. 6, 2016.

(51) Int. Cl.
*B60C 17/00*    (2006.01)
*B60C 17/06*    (2006.01)
(Continued)

(52) U.S. Cl.
CPC ........ *B60C 17/065* (2013.01); *B29D 30/0061* (2013.01); *B29D 30/72* (2013.01);
(Continued)

(58) Field of Classification Search
USPC ............................................... 152/511, 331.1
See application file for complete search history.

(56) References Cited

U.S. PATENT DOCUMENTS 532,879 A * 1/1895 Humphreys ............ B60C 17/01
152/341.1
642,776 A * 2/1900 Anderson ................. B60C 5/20
152/339.1

(Continued)

FOREIGN PATENT DOCUMENTS

CA    1064378    10/1979
DE    4017739 A1    1/1991
(Continued)

OTHER PUBLICATIONS

European Search Report dated Dec. 19, 2019 issued in corresponding European Patent Application No. 17824853.0, consisting of 6 pages.

(Continued)

*Primary Examiner* — Timothy Kennedy
*Assistant Examiner* — Farah Taufiq
(74) *Attorney, Agent, or Firm* — Shaun J. Fox; Alan M. Weisberg

(57) ABSTRACT

A motor vehicle tire is disclosed with a pair of post-cure run-flat inserts, each of the pair of post-cure run-flat inserts is disposed within a tire cavity between a shoulder region and a respective upper sidewall region of the tire. The tire further includes a cylindrical sidewall defining an interior cylindrical cavity, each of the cylindrical sidewall and the interior cylindrical cavity extending 360 degrees about a (Continued)

rotational axis of the tire, the cylindrical sidewall having an exterior surface contacting a radially inner surface of an inner liner between the shoulder region and the respective upper sidewall region during a normal inflation condition of the tire.

10 Claims, 10 Drawing Sheets

(51) Int. Cl.
  *B29D 30/00*  (2006.01)
  *B29D 30/72*  (2006.01)
  *B60C 5/00*  (2006.01)

(52) U.S. Cl.
  CPC .............. *B60C 5/002* (2013.01); *B60C 17/00* (2013.01); *B29D 2030/722* (2013.01)

(56) References Cited

U.S. PATENT DOCUMENTS

| | | | |
|---|---|---|---|
| 1,616,293 A * | 2/1927 | Wolfe | ................... B60C 5/20 152/312 |
| 4,334,565 A | 6/1982 | Stokes | |
| 4,372,365 A | 2/1983 | Osada et al. | |
| 4,392,522 A | 7/1983 | Bschorr | |
| 4,459,167 A | 7/1984 | Markow et al. | |
| 4,953,291 A | 9/1990 | Markow | |
| 5,271,444 A | 12/1993 | Chen | |
| 5,756,942 A | 5/1998 | Tanaka et al. | |
| 7,360,570 B2 | 4/2008 | Ishida | |
| 7,677,286 B2 | 3/2010 | Tanno | |
| 2001/0032692 A1 | 10/2001 | Nguyen et al. | |
| 2005/0032981 A1 * | 2/2005 | Yu | ........................ C08L 77/06 525/191 |
| 2007/0044887 A1 | 3/2007 | Jin et al. | |
| 2007/0199636 A1 | 8/2007 | Tanno | |
| 2015/0083296 A1 * | 3/2015 | Asper | ................ B60C 17/0018 152/323 |
| 2019/0176422 A1 * | 6/2019 | Liao | ........................ C08J 7/043 |

FOREIGN PATENT DOCUMENTS

| | | | |
|---|---|---|---|
| DE | 102007011025 A1 * | 9/2008 | ........... B60C 23/003 |
| WO | 2015080935 A1 | 6/2015 | |

OTHER PUBLICATIONS

International Search Report and Written Opinion dated Sep. 21, 2017 for International Application No. PCT/US2017/040824 filed on Jul. 6, 2017, consisting of 12-pages.

* cited by examiner

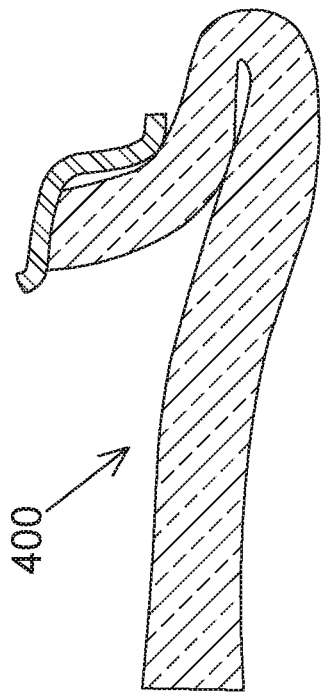
Fig. 4 Conventional Tire Deflated Shape
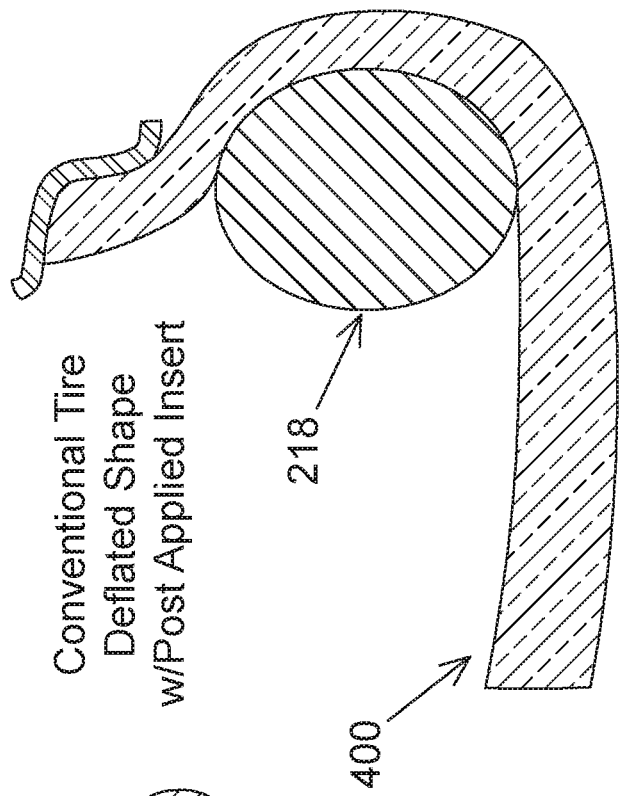
Fig. 6 Conventional Tire Deflated Shape w/Post Applied Insert
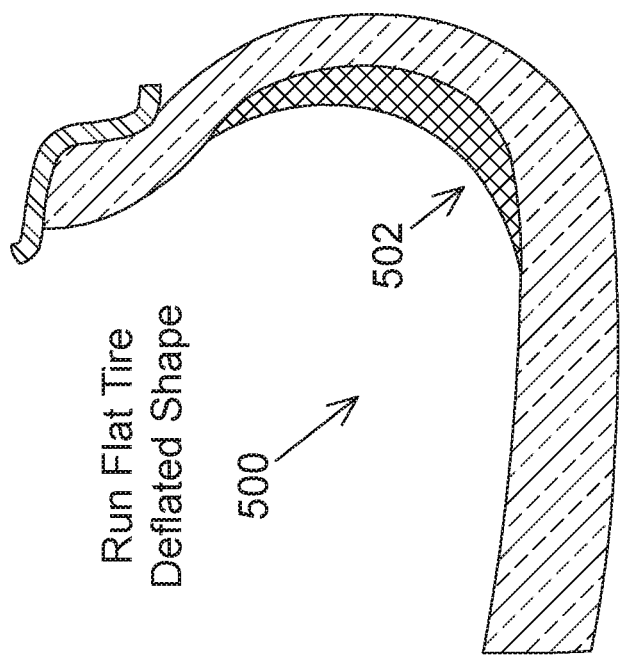
Fig. 5 Run Flat Tire Deflated Shape

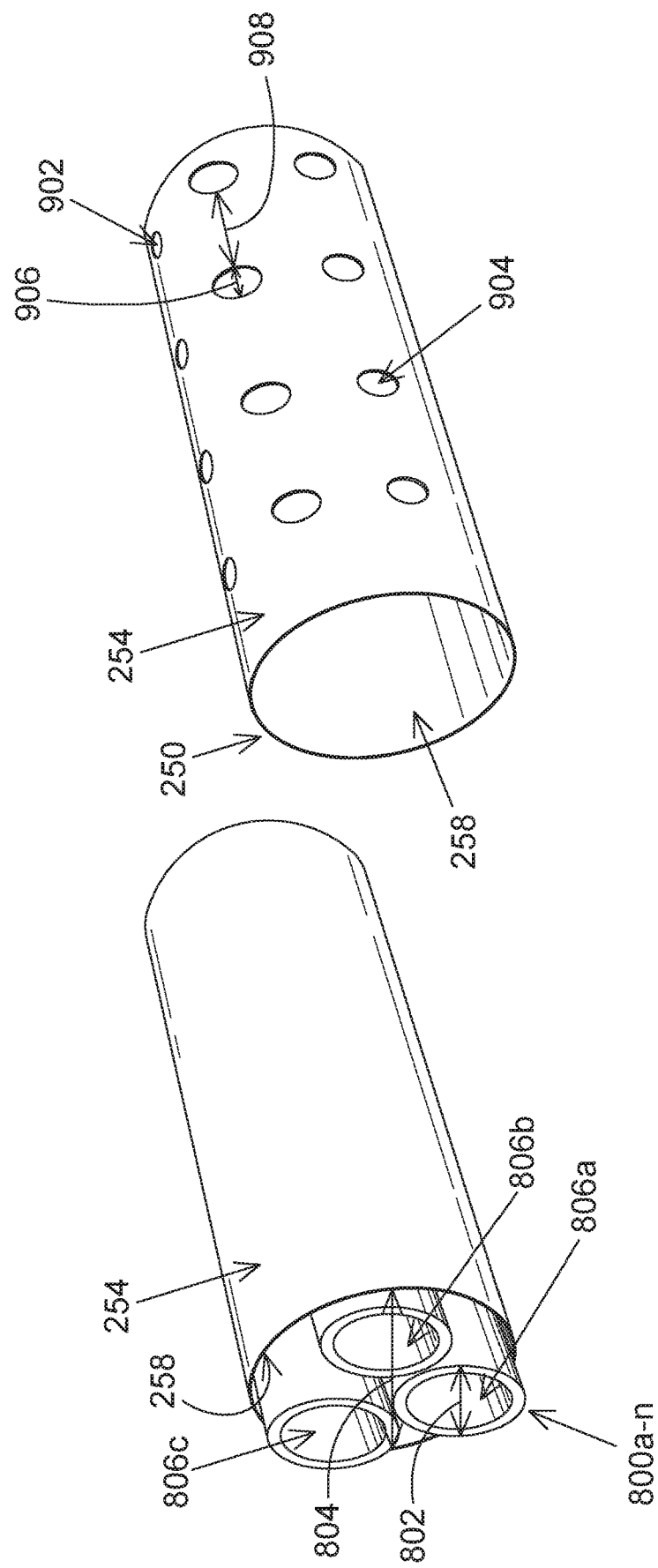

POST-CURE RUN-FLAT AND/OR NOISE REDUCTION APPARATUS AND METHOD OF MANUFACTURING THE SAME

FIELD OF THE INVENTION

The present invention relates generally to a run-flat tire, and, more particularly, relates to a post-cure sidewall stabilizing run-flat insert and methods of manufacturing the same.

BACKGROUND OF THE INVENTION

It is well-known that automobile tires are provided in run-flat configurations. Run-flat tires are used by automobile manufacturers to eliminate the need for spare tires, thereby increasing available space within a vehicle and reducing vehicle curb weight. Many vehicle operators prefer the convenience of a run-flat tire because it is able to continue operating even under loss of inflation pressure. Run-flat tires are designed to be able to function for a limited time and distance at zero inflation pressure, also referred to in the art as a "zero (0) psi state."

Conventional run-flat tires may include a reinforced sidewall area to support a load in the zero psi state. Some conventional run-flat tires are supported in the zero psi state by a sidewall-stabilizing reinforcement run-flat insert 100 made of a high durometer rubber, as shown in FIG. 1. Such sidewall-stabilizing reinforcement run-flat inserts 100a-b are typically disposed within each sidewall region between a body ply 102 and an inner liner 104. The sidewall-stabilizing reinforcement run-flat inserts 100a-b may also extend from just below an edge of a belt structure 106 and terminate at an area above the bead core 108, as illustrated in FIG. 1. During manufacturing of the conventional run-flat tire, the sidewall-reinforcing inserts 100a-b are typically applied at the tire assembly machine (TAM) after the inner liner 104 is applied to a run-flat building drum and before the body ply 102 is applied to the building drum. The sidewall-reinforcing inserts 100a-b are typically cured-in inserts, i.e., cured as part of a green tire in the conventional manner of curing tires.

There is an ongoing effort in the tire industry to improve the durability of run-flat tires and decrease the costs and complexity involved in manufacturing run-flat tires. Complexity of the tire design and the tire assembly process results in increased production time and increased costs.

Prior art attempts to provide run-flat support within an tire cavity have been made, but are deficient. One such example is a device used in a run-flat tire and disclosed in U.S. Pat. No. 4,334,565 by Stokes. The tire disclosed in the Stokes patent includes a toroidal insert disposed in the tire cavity to support a load during a deflated condition. However, in such deflated condition, the ride behavior of the tire is similar to that of a deflated tire without the toroidal insert, which may be unacceptable. Also, the irregular shape of the toroidal insert and the central placement of the load-bearing members 38 and 40 primarily provides run-flat support in the central foot-print area, with the end portions 30 and 32 merely providing minor, ancillary support for the sidewalls. Further, because the toroidal insert extends across the rim portion, it may block heat from escaping the enclosed tire cavity via heat radiating through the metallic rim, thereby accelerating tire wear.

U.S. Pat. No. 4,953,291 by Markow discloses a device with two elastomeric members 12 and 14 connected to two corresponding flexible discs 16 and 18 that secure the device to the rim sections 8 and 10. During a deflation condition, the elastomeric members 12 and 14 of the Markow patent are translated radially outward, by the flexible discs 16 and 18, into the sidewall folds to support the collapsed sidewalls. The device of the Markow patent increases the complexity of the tire by requiring attachment of the device to a bracket 2 that is welded to the rim sections 8 and 10. Accordingly, the device of the Markow patent increases complexity of the overall tire design and the manufacturing processes, which is undesirable.

Therefore, a need exists to overcome the problems with the prior art as discussed above.

SUMMARY OF THE INVENTION

The invention provides a post-cure run-flat and/or noise reduction apparatus and method of manufacturing that overcomes the hereinafore-mentioned disadvantages of the heretofore-known devices and methods of this general type and that provides a pneumatic tire design with run-flat support and/or noise reduction that, in some embodiments, can be manufactured in a manner that is not much of a deviation from conventional tire assembly processes.

With the foregoing and other objects in view, there is provided, in accordance with the invention, a run-flat tire including a pair of post-cure run-flat inserts, each of the pair of post-cure run-flat inserts is disposed within an inner tire region between a shoulder region and a respective upper sidewall region of a tire; extends 360 degrees about a rotational axis of the tire; has a circular cross-section; and is secured to a radially inner surface of an inner liner during a normal inflation condition of the tire.

In accordance with another feature of the present invention, each of the pair of post-cure run-flat inserts includes a cylindrical sidewall defining an interior cylindrical cavity, each of the cylindrical sidewall and the interior cylindrical cavity extending 360 degrees about the rotational axis of the tire, the cylindrical sidewall having an exterior surface that is secured to the radially inner surface of the inner liner during the normal inflation condition of the tire by an adhesive material.

In accordance with another feature, an embodiment of the present invention includes a tread, the inner liner disposed beneath the tread; a first bead portion and a second bead portion axially spaced apart from one another, each bead portion having a bead core and a bead filler; and at least one body ply having a main body ply portion extending circumferentially about the tire, at least a portion of the main body ply portion disposed between the tread and the inner liner; and having a first turned-up portion and a second turned-up portion, the first turned-up portion looping around the first bead portion and the second turned-up portion looping around the second bead portion.

In accordance with a further feature of the present invention, the pair of post-cure run-flat inserts is operably configured to provide run-flat support in an uninflated condition of the tire without a conventional cured-in sidewall-stabilizing reinforcement run-flat insert disposed in the sidewall region between the inner liner and the at least one body ply.

In accordance with another embodiment of the present invention, the cylindrical sidewall is comprised of a polymer material.

In accordance with yet another embodiment of the present invention, the cylindrical sidewall and the interior cylindrical cavity extends continuously 360 degrees about the rotational axis of the tire.

In accordance with another feature, an embodiment of the present invention also includes a foam material disposed within the interior cylindrical cavity defined by the cylindrical sidewall.

In accordance with yet another feature, an embodiment of the present invention includes air disposed within the interior cylindrical cavity defined by the cylindrical sidewall.

In accordance with yet another feature, an embodiment of the present invention also includes a plurality of interior load-bearing annular members is disposed within the interior cylindrical cavity defined by the cylindrical sidewall, each of the plurality of interior load-bearing annular members having a diameter that is smaller than a diameter of the cylindrical sidewall.

In accordance with a further feature of the present invention, the diameter of each of the plurality of interior load-bearing annular members is no more than ½ the diameter of the cylindrical sidewall.

In accordance with yet a further feature of the present invention, each of the plurality of interior load-bearing annular members extends 360 degrees about the rotational axis of the tire and has a circular cross-section.

In accordance with another feature of the present invention, the cylindrical sidewall is reinforced with wire.

In accordance with another feature, an embodiment of the present invention includes a pair of post-cure noise reduction inserts, each of the pair of post-cure noise reduction inserts is disposed within an inner tire region between a shoulder region and a respective upper sidewall region of a tire; includes a cylindrical sidewall defining an interior cylindrical cavity, each of the cylindrical sidewall and the interior cylindrical cavity extending 360 degrees about a rotational axis of the tire and the cylindrical sidewall having an exterior surface that is secured to a radially inner surface of an inner liner between the shoulder region and the respective upper sidewall region. The cylindrical sidewalls are also formed as a Helmholtz resonator by the exterior surface of the cylindrical sidewall defining a plurality of apertures in fluid communication with a tire cavity and dimensioned and spaced-apart from one another to generate out-of-phase acoustic waves operable to destructively interfere with incident acoustic tire cavity waves.

In accordance with another feature of the present invention, the plurality of apertures are further dimensioned and spaced-apart from one another according to a uniform pattern that extends continuously 360 degrees about the rotational axis of the tire.

In accordance with yet another feature of the present invention, the plurality of apertures are disposed across at most 33% of the exterior surface of the cylindrical sidewall.

In accordance with another feature, an embodiment of the present invention includes a method of manufacturing a run-flat tire, the method including the steps of providing a green tire in a tire mold; curing the green tire in the tire mold; and removing the cured tire from the tire mold. After the step of removing the cured tire from the tire mold, positioning a pair of run-flat inserts within an inner tire region between a shoulder region and a respective upper sidewall region of the cured tire so as to secure an exterior surface of each of the pair of run-flat inserts with a radially inner surface of an inner liner between the shoulder region and the respective upper sidewall region such that a cylindrical sidewall included in each of the pair of run-flat inserts and an interior cylindrical cavity defined by the cylindrical sidewall extends 360 degrees about a rotational axis of the cured tire.

In accordance with yet another feature of the present invention, the step of curing the green tire further includes a step of curing the green tire in the tire mold without a sidewall-reinforcing run-flat insert.

In accordance with yet another feature of the present invention, after the step of removing the cured tire from the tire mold and before positioning the pair of run-flat inserts, applying an adhesive material to at least one of the radially inner surface of the inner liner and the exterior surface of each of the pair of run-flat inserts.

In accordance with yet another feature, an embodiment of the present invention also includes applying an adhesive rubber gum to the at least one of the radially inner surface of the inner liner and the exterior surface of each of the pair of run-flat inserts.

In accordance with a further feature, an embodiment of the present invention also includes providing each of the pair of run-flat inserts with a plurality of apertures defined by the exterior surface of the cylindrical sidewall; and applying heat to the adhesive rubber gum sufficient to cause a flow of the adhesive rubber gum through at least a portion of the plurality of apertures and to simultaneously harden the adhesive rubber gum so as to further secure the pair of run-flat inserts to the inner liner.

Although the invention is illustrated and described herein as embodied in a post-cure run-flat and/or noise reduction apparatus and method of manufacturing, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

As used herein, the terms "axial" and "axially" is intended to indicate lines or directions that are parallel to the axis of rotation of the tire. The terms "radial" and "radially" are defined as lines or directions radially toward or away from the axis of rotation of the tire. "Circumferential," as used herein, is intended to indicate circular lines or directions extending along the perimeter of the surface of the annular tread perpendicular to the axial direction. The term "equatorial plane" (EP) is intended to indicate a plane perpendicular to the tire's axis of rotation and passing through the center of the tread. The acronym "psi" stands for pounds per square inch. "Normal inflation pressure," as used herein, is defined as the specific design inflation pressure at a specified load assigned by the appropriate standards organization for the service condition for the tire. "Normal load," and "loaded condition," as used herein, is intended to indicate the specific design inflation pressure and load assigned by the appropriate standards organization for the service condition for the tire. "Section height" (SH) means the radial distance from the nominal rim diameter to the outer diameter of the tire at its equatorial plane. The terms "zero psi," "uninflated," "underinflated," "deflated," and "run-flat condition" are used herein interchangeably to identify a condition in which the tire is operating under a loss of normal operating inflation pressure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is a partial cross-sectional view of a conventional non-run-flat tire in a deflated condition;

FIG. 5 is a partial cross-sectional view of a conventional run-flat tire with a sidewall-reinforcing insert disposed within the sidewall region between the inner liner and the body ply, in a deflated condition;

FIG. 6 is a partial cross-sectional view of a conventional tire with a post-cure run-flat insert disposed in a tire cavity between a shoulder and an adjacent upper sidewall region, in accordance with an embodiment of the present invention;

FIG. 8 is a perspective view of a post-cure run-flat insert with a multi-chamber support, in accordance with an exemplary embodiment of the present invention;

FIG. 9 is a perspective view of a post-cure noise reduction insert defining a plurality of apertures operable to reduce tire cavity noise, in accordance with an exemplary embodiment of the present invention;

DETAILED DESCRIPTION OF THE INVENTION

Figure 1:
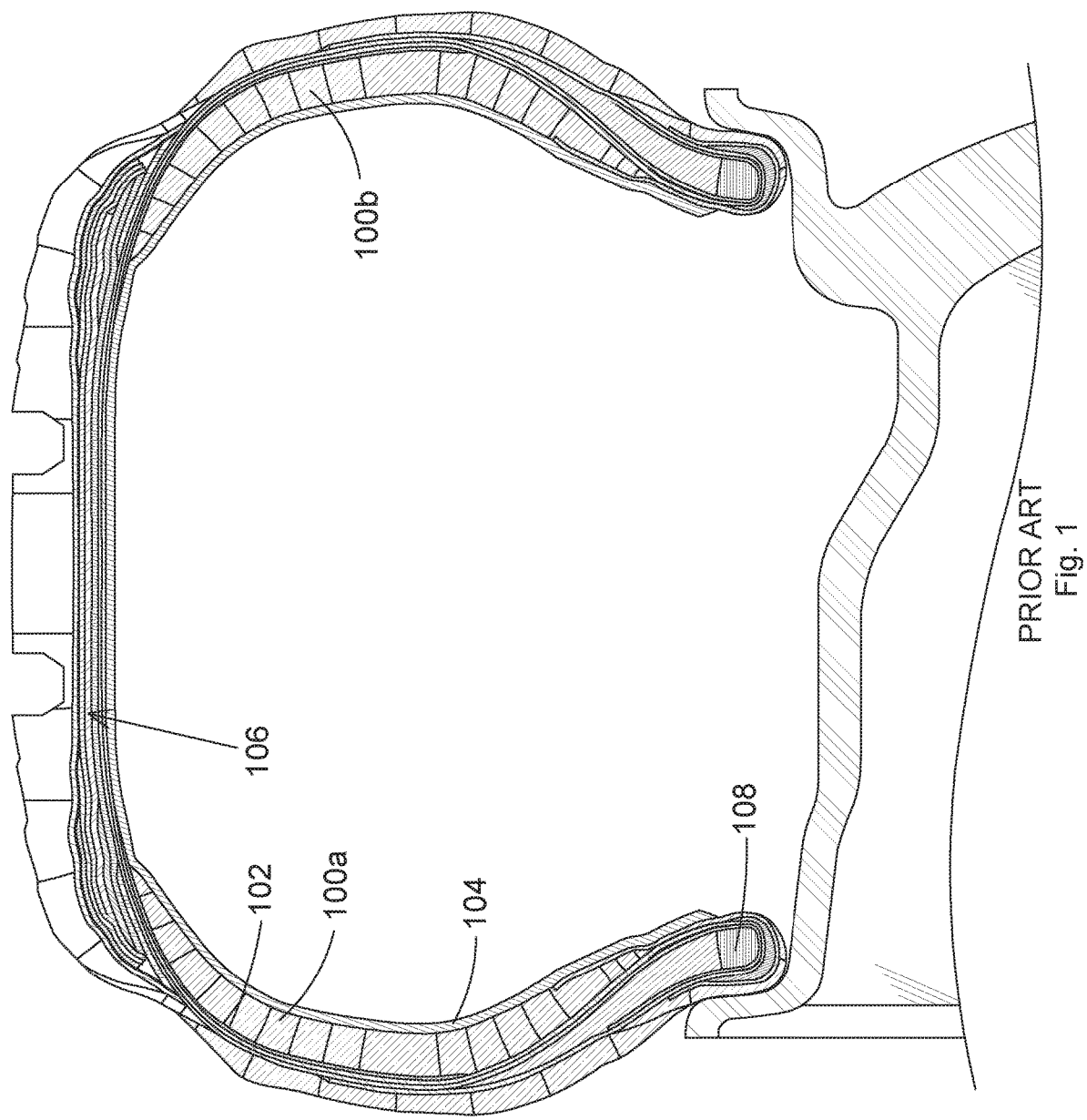
FIG. 1 is a cross-sectional view of a prior art run-flat tire with a sidewall-reinforcing insert disposed within a sidewall region between an inner liner and a body ply.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Although the invention is illustrated and described herein with reference to specific embodiments, the invention is not intended to be limited to the details shown. Rather, various modifications may be made in the details within the scope and range of equivalents of the claims and without departing from the invention.

The present invention provides a novel and efficient post-cure tire insert. Embodiments of the invention provide for run-flat performance from a conventional non-run-flat tire by applying a cylinder-shaped insert to an inner liner of a cured tire in a shoulder-upper sidewall region. In addition, embodiments of the invention provide for securing the cylinder-shaped insert to the inner liner via a permanent or semi-permanent adhesive material. Some embodiments of the present invention provide a tire with the cylinder-shaped inserts positioned to support the shoulder-sidewall region by being lodged between the shoulder and the respective sidewall region forming a wedge between the two areas on each side of the tire such that a load may be carried in an uninflated, or underinflated condition. In further embodiments, the cylinder-shaped inserts may be reinforced with foam rubber, air, or other cylinder-shaped inserts disposed within a cavity defined by the cylinder-shaped inserts. In additional embodiments, the cylinder-shaped inserts may be reinforced with wire so as to be operable to support the tire in a run-flat condition without any reinforcing filler materials disposed within the cylindrical cavity.

In yet other embodiments, the cylinder-shaped insert may be perforated or otherwise provided with apertures for allowing air to flow into and outside of the cavity defined by the cylinder-shaped insert. In a further embodiment, the apertures may be dimensioned and spaced-apart so as to reduce tire cavity noise through Helmholtz resonance.

Figure 2:
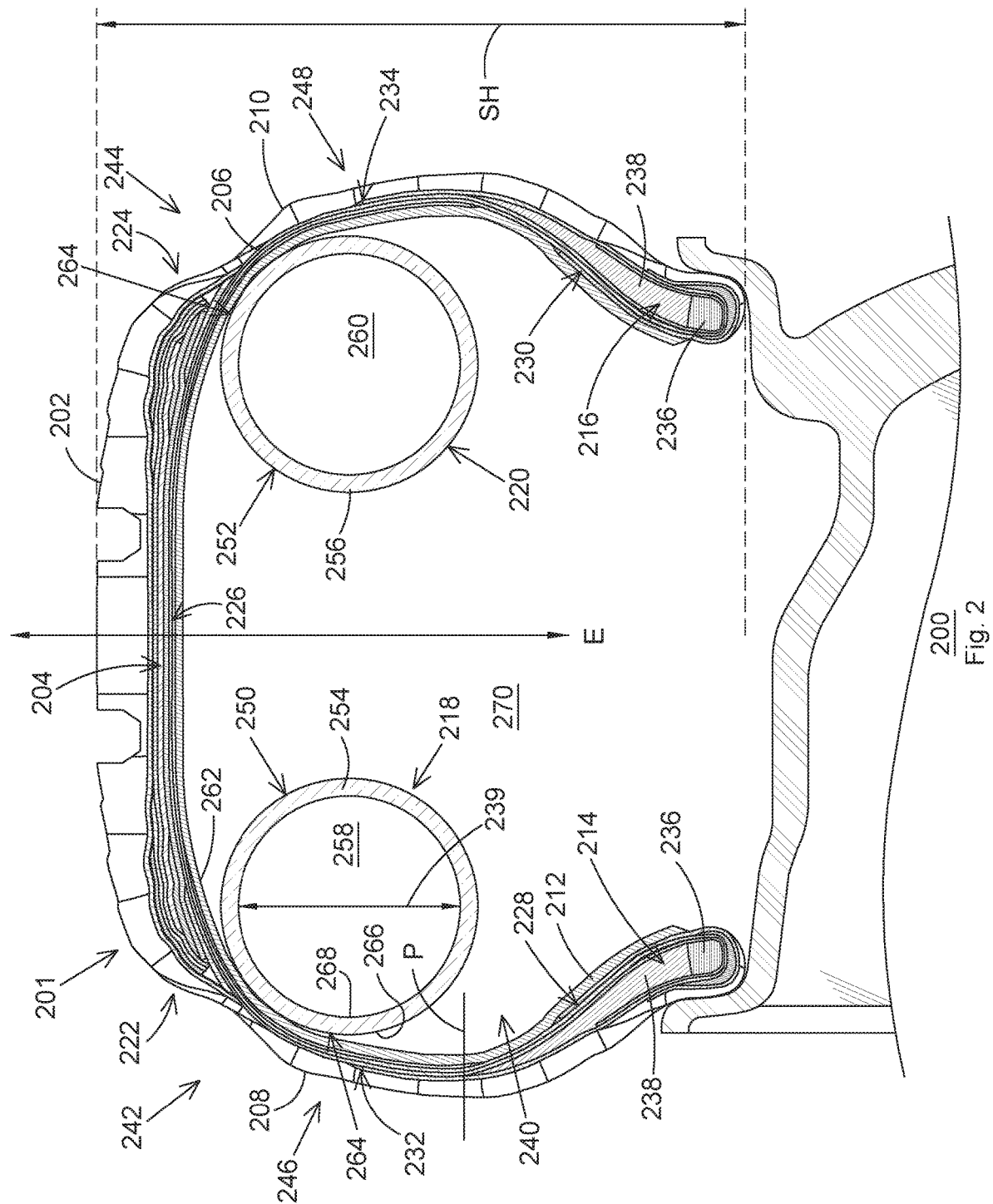
FIG. 2 is a cross-sectional view of an exemplary embodiment of a pneumatic tire in accordance with the present invention.

Referring now to FIG. 2, one embodiment of the present invention is shown in a cross-sectional view. FIG. 2 shows several advantageous features of the present invention, but, as will be described below, the invention can be provided in several shapes, sizes, combinations of features and components, and varying numbers and functions of the components. The first example of a pneumatic tire 200, as shown in FIG. 2, includes a main tire body 201 having a tread 202, a belt structure 204, a body ply 206, a first and second sidewall 208 and 210, an inner liner 212, and a first and second bead portion 214 and 216. In addition to the main tire body 201, the inventive pneumatic tire 200 also includes a pair of post-cure run-flat inserts 218, 220.

The tread 202 includes a first end 222 and a second end 224 opposite the first end 222. The tread 202 is a rubber compound on an outer portion of the run-flat tire 200 that comes into contact with a ground surface. In other words, "tread" refers to the portion of the tire that comes into contact with the road under a normal load. The tread 202 provides the grip or traction required for driving, braking, and cornering. The tread 202 may include one or more grooves, lugs, voids, and/or sipes that define the geometrical shape of the tread 202.

The belt structure 204 can include at least one belt 204, preferably at least two belts 204. In one embodiment, the belt structure 204 is disposed radially outward of the body ply 206 and radially inward of the tread 202. Stated another way, the belt structure 204 is disposed between the tread 202 and the body ply 206. In another embodiment, the belt structure 204 includes two steel belt plies, each belt ply including steel parallel cords oriented at opposite angles to one another and disposed directly on top of the body ply 206. The belt structure 204 is also commonly referred to as "stabilizer plies." The belt structure 204, i.e. stabilizer plies, is operably configured to restrict expansion of the body ply 206 cords, stabilize the tread area, and provide impact resistance. In one embodiment, the belt structure 204 is made of materials other than steel. In yet another embodiment, the belt structure 204 is made with three or more belt plies. In a further embodiment, the belt structure 204 is made of woven materials, instead of parallel-aligned cords. As used herein, the term "cord" is intended to indicate reinforcement strands of which the plies of a tire, and other components of a tire, are comprised of. The term "ply" is intended to indicate a layer with parallel cords.

In one embodiment, the pneumatic tire 200 includes a single body ply 206. In further embodiments, the pneumatic tire 200 can include two or more body plies 206. In yet another embodiment, the body ply 206 extends continuously from the first bead portion 214 to the second bead portion 216. The body ply 206 is configured to provide strength to contain the air pressure and provide for sidewall impact resistance. In one embodiment, the body ply 206 includes parallel cords encapsulated in a rubber coating, also referred to in the art as "body ply skim." In another embodiment, the body ply 206 extends radially across the run-flat tire 200, wrapping around each of the first and second bead portions 214, 216. Stated another way, the body ply 206 can be seen as including a main body ply portion 226, a first turned-up portion 228, and a second turned-up portion 230, each of the turned-up portions 228, 230 extending from opposing ends of the main body ply portion 226. The main body ply portion 226 can extend circumferentially about the pneumatic tire 200 in a continuous manner. In one embodiment, the main body ply portion 226 is disposed between the tread 202 and the inner liner 212. More particularly, at least a portion of the main body ply portion 226 can be disposed directly between the belt structure 204 and the inner liner 212, where the belt structure 204 is disposed radially outward of the main body ply portion 226 and the inner liner 212 is disposed radially inward of the main body ply portion 226. In some embodiments, cords of the body ply 206 may be made from, for example, polyester, nylon, rayon, steel, aramid, fiberglass, or any other suitable metal or textile.

In one embodiment, each of the first 228 and second turned-up portions 230 loops around the corresponding bead portion 214, 216, respectively. In another embodiment, the first turned-up portion 228 includes a first end 232 and the second turned-up portion 230 includes a second end 234, opposite the first end 232. Stated another way, the first end 232 and the second end 234 can be considered opposite edges of the body ply 206. In one embodiment, each of the first end 232 and the second end 234 terminates in a respective first and second sidewall region. In another embodiment, each of the first end 232 and the second end 234 contacts a surface of the body ply 206 after looping around the respective bead portion 214, 216. In a further embodiment, each of the first end 232 and the second end 234 contacts a radially outer surface of the body ply 206 after looping around the respective bead portion 214, 216. In yet a further embodiment, the first turned-up portion 228 can be said to loop around the first bead portion 214 in a clockwise direction, while the second turned-up portion 230 loops around the second bead portion 216 in a counter-clockwise direction.

In one embodiment, each of the first and second sidewalls 208, 210 is axially spaced apart from one another. Each sidewall 208, 210 can be said to extend from the respective bead portion 214, 216 to the respective tread end 222, 224. In a preferred embodiment, the sidewalls 208, 210 are made of a rubber material and are configured to protect the body ply 206 from abrasion, impact, and flex fatigue. In some embodiments, a radially outward surface of each the sidewalls 208, 210 is exposed to and viewable from the outside environment and may also carry decorative treatments, including white or colored stripes or letters. Sidewall rubber compounds can be formulated to resist cracking due to environmental hazards, such as ozone, oxygen, UV radiation, and heat.

The inner liner 212 is disposed beneath the tread 202. Said another way, the inner liner 212 is disposed radially inward of the tread 202. The "inner liner," as used herein, is intended to indicate a layer that forms an inner peripheral surface of a tubeless tire. In one embodiment, the inner liner 212 is a relatively thin, layer of elastomer, specially formulated to improve air retention by lowering permeation of air outwards through the tire 200. In other embodiments, the inner liner 212 may be made of a different material. In some conventional tires, the inner liner 212 is considered the inner-most layer of the tire 200.

In one embodiment, each of the pair of bead portions 214 is axially spaced apart from one another. In another embodiment, each of the pair of bead portions 214 includes a bead core 236 and a bead filler 238. In some embodiments, the bead core 236 can be considered the portion of the tire that engages a rim on a wheel. In one embodiment, the bead core 236 includes individual bronze plated bead wires that are rubber coated and wound into a bundle of bead wires of a specified diameter and configuration, anchoring an inflated tire to a wheel rim. In some embodiments, the bead wire may be carbon steel wire. In other embodiments, the bead wire may be made of other metal materials. In another embodiment, the bead core 236 can be considered an annular inextensible member, holding a tire to the rim and being wrapped around by one or more body plies 206.

The bead filler 238, also known in the art as the apex, can be applied on top of the bead core 236 to fill a cavity formed between a radially inward portion of the body ply 206 and respective ends 232, 234 of the turned-up portions of the body ply 206. In a preferred embodiment, the bead filler 238 is of a rubber material and may be formed so as to have a triangular cross-sectional shape. In some embodiments, the bead filler 238 is of a high durometer rubber material. In other embodiments, the bead filler 238 may include a low durometer rubber material. In yet other embodiments, the bead filler 238 may terminate within a plane (P) that lies in a central portion of the sidewall region. As used herein, the term "central portion" is intended to indicate a middle section of a sidewall region between a top section and a bottom section of the sidewall region, where the middle section, the top section, and the bottom section are each one-third sections of the sidewall region.

In yet another embodiment, the bead filler 238 extends radially from the bead core 236 to a distance of no more than 40% of the section height. In yet another embodiment, the bead filler 238 extends radially from the bead core 236 to a distance of no more than 50% of the section height. In yet a further embodiment, the bead filler 238 can be said to terminate at or beneath a plane that lies at a point about midway between the bead core 236 and the respective tread end 222, 224. Varying the bead filler height and hardness can affect the tire's 200 ride and handling properties and may impact sidewall stiffness.

Figure 3:
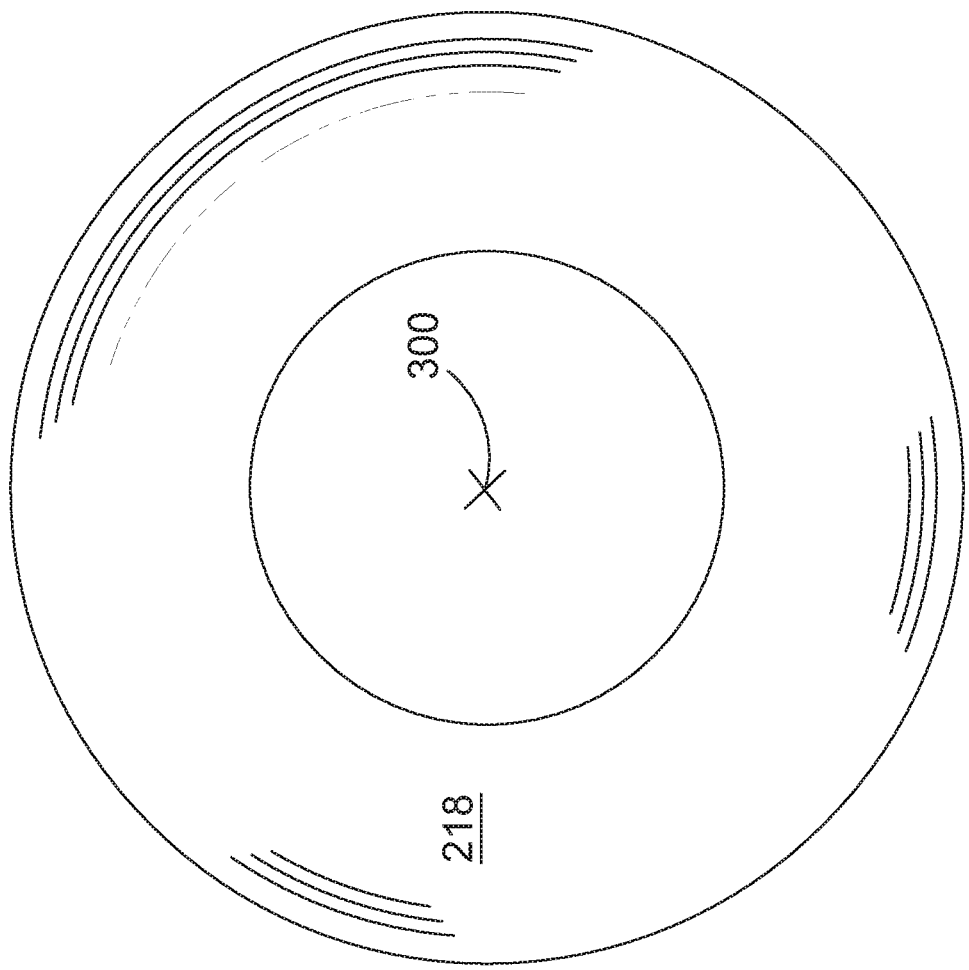
FIG. 3 is an elevational side view of an exemplary post-cure insert, in accordance with an embodiment of the present invention.

Referring now to FIGS. 2 and 3, the pair of post-cure run-flat inserts 218, 220 are each disposed within an inner tire region 240. As used herein, the term "post-cure" is intended to indicate inserts that are applied to a tire after the green tire has been cured within a tire mold. An exemplary method of applying such post-cure inserts is described herein below with reference to the flowchart in FIG. 11.

As used herein, the term "inner tire region" is intended to indicate an area defined by radially inner surfaces of the main tire body 201 that, when the tire 200 is mounted to a wheel, is sealed by a rim of the wheel. More particularly, each of the pair of post-cure run-flat inserts 218, 220 is wedged within the inner tire region 240 between a shoulder region 242, 244 and a respective upper sidewall region 246, 248 of the tire 200. The "shoulder region" means the portion of the tire where an edge of the tread transitions to the sidewall region. The "sidewall region" means a portion of the tire between the tread and the bead core. The "upper sidewall region" means a portion of the sidewall region closest to the tread and farthest from the bead core.

In one embodiment, each of the pair of post-cure run-flat inserts 218, 220 is disposed entirely within an upper 50% of the respective sidewall region. In other words, each of the pair of post-cure run-flat inserts 218, 220 may not extend below the upper 50% of the sidewall region. In another embodiment, each of the pair of post-cure run-flat inserts 218, 220 is disposed entirely within an upper 40% of the respective sidewall region. In yet another embodiment, each of the pair of post-cure run-flat inserts 218, 220 may be secured to the tire 200 so as to lie substantially above the plane, P. As used herein the term, "substantially above" means that at least 85% of a diameter 239 of each of the pair of post-cure run-flat inserts 218, 220 lies substantially above the plane, P.

The diameter 239 of each of the pair of post-cure run-flat inserts 218, 220 will naturally vary with the tire size and application load. In a preferred embodiment, each of the pair of post-cure run-flat inserts 218, 220 is sized and configured to operate as a wedge between an inflated tire section height and an uninflated tire section height at a loaded condition. Accordingly, the diameter 239 of each of the pair of post-cure run-flat inserts 218, 220 should be between 25% and 35% of the inflated tire section height in a loaded condition. As used herein, the term "between" is intended to be inclusive of the outer range limits.

It should be understood that the description herein of the placement or disposition of the inserts 218, 220 relative to other structural elements of the tire 200 are described as the placement or disposition of such elements during a normal inflation condition of the tire 200, unless otherwise expressly indicated. In other words, it should be understood by a person of ordinary skill in the art that structural elements of the tire 200 may move or be altered during a deflated condition of the tire 200.

Each of the pair of post-cure run-flat inserts 218, 220 can be considered an annular member extending 360 degrees. When disposed within the tire 200 in an operational configuration of the tire 200, each of the pair of the post-cure run-flat inserts 218, 220 is disposed so as to extend 360 degrees about a rotational axis 300 of the tire 200. Stated another way, each of the pair of the post-cure run-flat inserts 218, 220 may be concentric with the tire 200.

In one embodiment, each of the pair of post-cure run-flat inserts 218, 220 has a circular cross-section 250, 252 and is formed as a hose or a tubular member. Stated another way, each of the pair of post-cure run-flat inserts 218, 220 may include a cylindrical sidewall 254, 256 defining an interior cylindrical cavity 258, 260. For each of the pair of post-cure run-flat inserts 218, 220, the cylindrical sidewall 254, 256 and the interior cylindrical cavity 258, 260 may extend continuously 360 degrees about the rotational axis 300 of the tire 200, as shown in FIG. 3.

The cylindrical sidewall 254, 256 may be made of a polymer-based material. In one embodiment, the cylindrical sidewall 254, 256 may be made of a rubber material. In a further embodiment, the cylindrical sidewall 254, 256 may be constructed similar to a conventional fire hose. In one embodiment, the cylindrical sidewall 254, 256 is made of a rigid or semi-rigid material. In another embodiment, the cylindrical sidewall 254, 256 may be made of a semi-rigid to flexible material that is reinforced with filler material so as to provide sufficient run-flat support for the tire 200. Of course, the filler material may also be provided in a rigid cylindrical sidewall 254, 256 embodiment. In one embodiment, the cylindrical sidewall 254, 256 may be made of a plastic polyvinyl chloride (PVC) material. In further embodiments, the cylindrical sidewall 254, 256 may be made of a rigid to semi-rigid PVC material, or a flexible PVC material.

Figure 12:
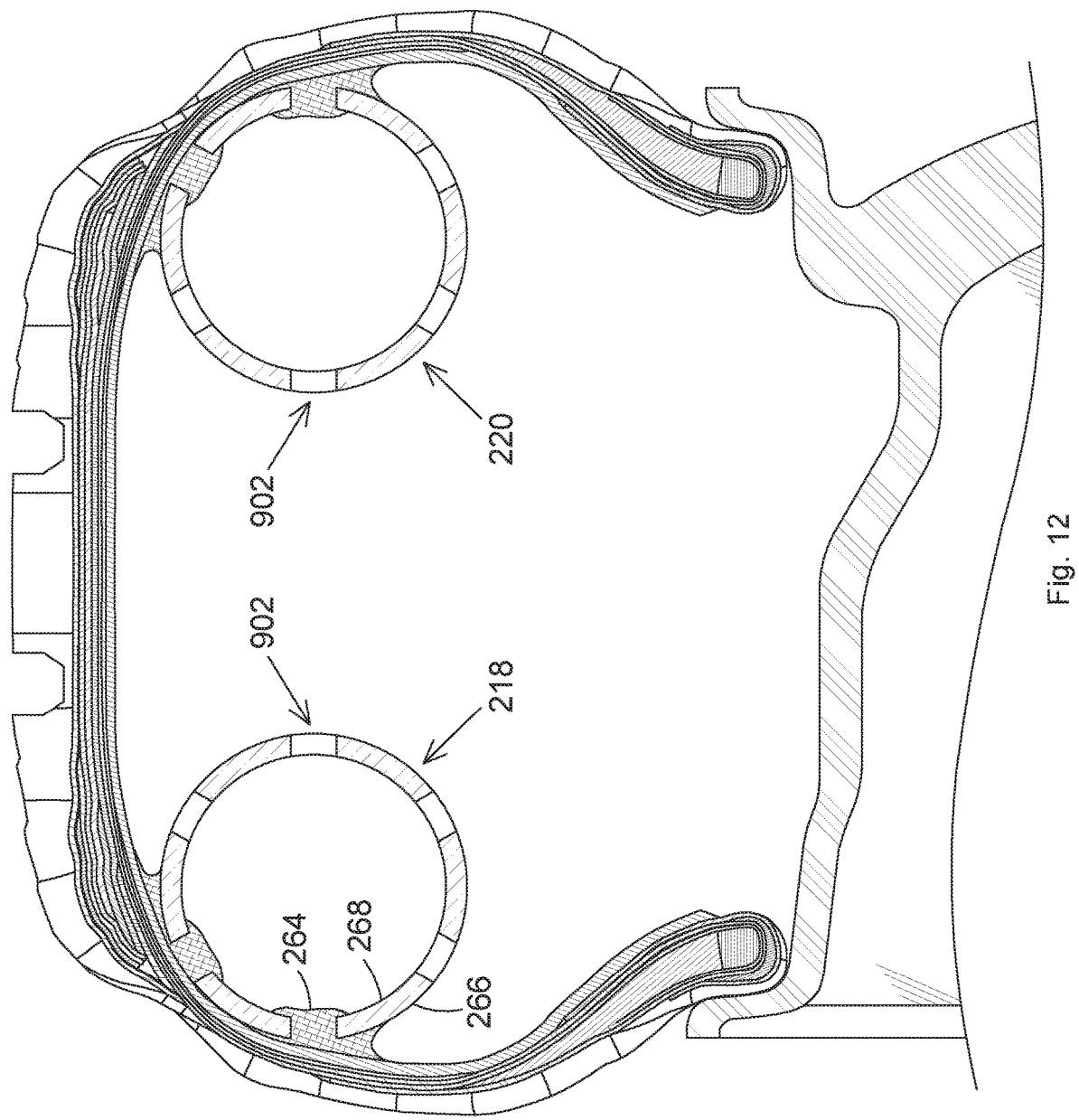
FIG. 12 a cross-sectional view of another exemplary embodiment of a pneumatic tire, illustrating an adhesive material securing cylindrical sidewalls to the inner liner, in accordance with the present invention.

Each of the pair of post-cure run-flat inserts 218, 220 may be secured to a radially inner surface 262 of the inner liner 212 during the normal inflation condition of the tire 200. In a preferred embodiment, the pair of post-cure run-flat inserts 218, 220 are secured to the radially inner surface of the inner liner 212 by an adhesive material 264. More specifically, the cylindrical sidewall 254, 256 may be secured to the radially inner surface 262 of the inner liner 212 by the adhesive material 264. In one embodiment, at least a portion of an exterior surface 266 of each of the cylindrical sidewalls 254, 256 is secured to the radially inner surface of the inner liner 212 by the adhesive material 264. In a further embodiment, the cylindrical sidewall 254, 256 may define a plurality of apertures 902 (see FIGS. 9 and 12). In such an embodiment, and as can be seen in FIG. 12, at least a portion of the adhesive material 264 may also extend into the interior cylindrical cavities 258, 260, via the apertures 902, and may adhere to at least a portion of an interior surface 268 of each of the cylindrical sidewalls 254, 256 so to provide addition dual-sided adhesion of the cylindrical sidewalls 254, 256 to the inner liner 212.

The adhesive material 264 may be considered a permanent or semi-permanent adhesive material 264. The adhesive material 264 should provide sufficient adhesion of the inserts 218, 220 to the radially inner surface 262 of the inner liner 212 over the normal operational life of the tire 200, as well as, sufficient adhesion to secure the inserts 218, 220 to the radially inner surface 262 during the zero psi state. In one embodiment, the adhesive material 264 may be a rubber gum. In a further embodiment, the adhesive material 264 may be a rubber gum that is similar to or identical to a cushion gum layer that is conventionally an uncured rubber-containing composition that, upon curing, mates new tread to the tire casing, during a retreading processes. The cushion gum layer is typically extruded in its uncured form and subsequently applied to the surface to be adhered. In another embodiment, the adhesive material 264 may be a rubber cement composition. In yet other embodiments, the adhesive material 264 may be formed as other types of adhesive compositions.

In alternative embodiments, each of the pair of post-cure run-flat inserts 218, 220 may be secured to the radially inner surface 262 of the inner liner 212 by other materials or structures. Importantly, each of the pair of post-cure run-flat inserts 218, 220 should be secured to the radially inner surface 262 so as to not become detached from the main tire body 201 during normal tire use and also during a deflated condition of the tire 200.

Each of the pair of post-cure run-flat inserts 218, 220 should be reinforced so as to provide run-flat support during a deflated condition of the tire 200. In one embodiment, the cylindrical sidewalls 254, 256 may be reinforced with wire. The wire may be a metallic wire or other rigid material. In another embodiment, the cylindrical sidewalls 254, 256 may be reinforced with a filler disposed within the inner cylindrical cavities 258, 260. In one embodiment, the filler may be air. In other words, air may be disposed within the interior cylindrical cavities 258, 260 so as to provide run-flat support during a deflation condition of the tire 200. In other embodiments, the filler may include other materials, as will be described in more detail with reference to FIGS. 7 and 8.

Referring now primarily to FIGS. 4-5, with brief reference to FIG. 1, in a preferred embodiment, the pair of post-cure run-flat inserts 218, 220 is operably configured to provide run-flat support in an uninflated condition of the tire 200 without any sidewall-stabilizing reinforcement inserts 100*a*, 100*b* disposed within the sidewall region between the inner liner 212 and the body ply 206. In other words, the main tire body 201 may be provided as a conventional non-run-flat tire. In such an embodiment, the post-cure run-flat inserts 218, 220 are operable to provide sufficient run-flat support, during a run-flat condition, without the additional support of prior art cured-in sidewall-stabilizing reinforcement inserts 100*a*, 100*b*. Stated yet another way, the inventive pneumatic tire 200 of the present invention may be manufactured according to conventional non-run-flat manufacturing processes during the pre-cure portion of the manufacturing process. Yet, after the tire is cured, the post-cure run-flat inserts 218, 220 may be applied so as to provide run-flat capability to the conventional non-run-flat tire. Accordingly, a tire manufacturer employing a conventional pneumatic tire assembly process may not be required to deviate substantially from its tire assembly process. Such conventional tire manufacturer may maintain its current tire manufacturing processes while merely adding, for example, an additional station to apply the inserts after the tire curing process.

FIGS. 4-6 are illustrative of this concept. FIG. 4 illustrates a conventional (non-run-flat) tire 400 in a deflated shape. FIG. 5 shows a prior art run-flat tire 500 with the traditional cured-in sidewall-stabilizing reinforcement insert 502 disposed in the sidewall region. As can be seen in FIG. 5, the sidewall-stabilizing reinforcement insert 502 supports the run-flat tire 500 so as to be able to maintain an upright, load-bearing position, during a run-flat condition. In other words, the deflated shape of the run-flat tire 500 resembles an inflated shape of the conventional tire 400. FIG. 6 illustrates an embodiment of the present invention in which the post-cure run-flat insert 218 is disposed in the shoulder—upper sidewall region of the conventional tire 400. As can been in FIG. 6, the post-cure run-flat insert 218 supports the conventional tire 400 in a run-flat condition such that the deflated shape of the conventional tire 400 resembles the deflated shape of the traditional run-flat tire 500, although devoid of the cured-in sidewall-stabilizing reinforcement insert 502.

Figure 7:
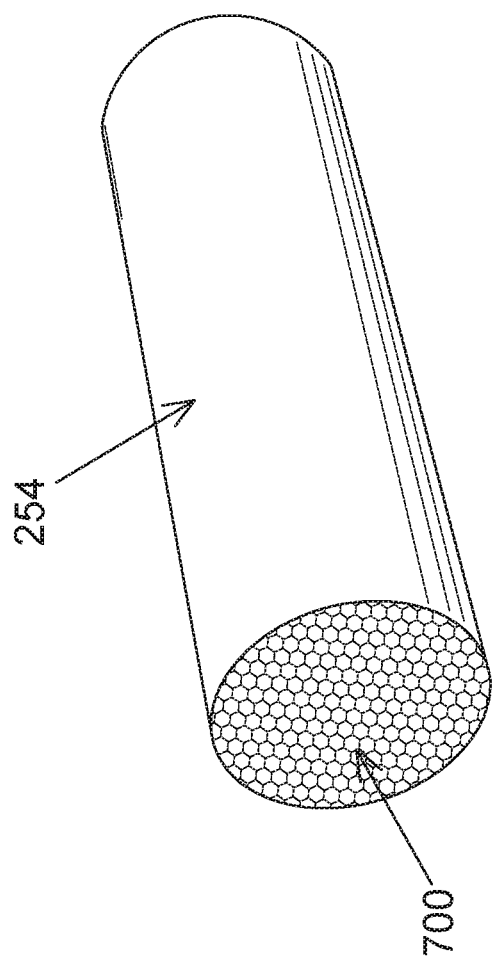
FIG. 7 is a perspective view of a post-cure run-flat insert with foam rubber, in accordance with an exemplary embodiment of the present invention.

Referring now primarily to FIG. 7, with reference brief to FIG. 2, the pair of post-cure run-flat inserts 218, 220 may be reinforced with a type of filler. More specifically, one or more filler materials may be disposed within the interior cylindrical cavities 258, 260 of the post-cure run-flat inserts 218, 220 in order to provide sufficient reinforcement for the tire 200 during a run-flat condition. In one embodiment, a foam material 700 may be disposed within the interior cylindrical cavities 258, 260. The foam material 700 may be a closed-cell foam material sufficient to provide load-bearing support during a run-flat condition. In another embodiment, the foam material 700 may be formed as a polyethylene foam material sufficient to reinforce the post-cure run-flat inserts 218, 220 during a run-flat condition. Advantageously, polyethylene foam is light weight material; yet together with the cylindrical sidewalls 254, 256, the polyethylene foam 700 provides a relatively significant reinforcing element. In other embodiments, other reinforcing materials may be disposed within the interior cylindrical cavities 258 260 that, together with the cylindrical sidewalls 254, 256, provides sufficient load-bearing support for the tire 200 during a deflated tire condition.

Referring now to FIG. 8, with brief reference to FIGS. 2-3, each of the pair of post-cure run-flat inserts 218, 220 are formed as a multi-chambered insert operable to provide run-flat support for the tire 200 during a deflated tire condition. In one embodiment, a plurality of interior load-bearing annular members 800*a-n* is disposed within each of the interior cylindrical cavities 258, 260 so as to provide a multi-chambered insert. In one embodiment, each of the plurality of interior load-bearing annular members 800*a-n* is made of the same or similar material as the cylindrical sidewalls 254, 256. In another embodiment, each of the plurality of interior load-bearing annular members 800*a-n* is made of a different material than that of the cylindrical sidewalls 254, 256. The plurality of interior load-bearing annular members 800*a-n* should be made of a material sufficient to provide run-flat support for the tire 200 when disposed within the cylindrical sidewalls 254, 256.

In one embodiment, each of the plurality of interior load-bearing annular members 800*a-n* is cylindrical in shape, having a circular-cross section. In a further embodiment, each of the plurality of interior load-bearing annular members 800a-n has a diameter 802 that is smaller than a diameter 804 of the respective cylindrical sidewall 254, 256 in which the members 800a-n are disposed. In yet a further embodiment, the diameter 802 of each of the plurality of interior load-bearing annular members 800a-n is no more than ½ the diameter 804 of the respective cylindrical sidewall 254, 256. In a preferred embodiment, the number, size, and arrangement of interior load-bearing annular members 800a-n disposed within the respective cylindrical sidewall 254, 256 is operably configured to provide sufficient run-flat support for the tire 200 in a deflated condition.

The number of interior load-bearing annular members 800 disposed within the cylindrical sidewall 254 or 256 between "a" through "n" can be any number. In the exemplary embodiment, there are provided three (3) interior load-bearing annular members 800 disposed within each of the cylindrical sidewalls 254, 256. This provides a multi-chambered insert with sufficient reinforcement to support a load during a deflated condition of the tire 200. In additional embodiments, there may be provided, within each cylindrical sidewall 254, 256, more than three (3) interior load-bearing annular members 800, and, in some cases, less than three (3) interior load-bearing annular members 800.

Each of the plurality of interior load-bearing annular members may extend continuously 360 degrees about the rotational axis 300 of the tire 200. In one embodiment, each of the plurality of interior load-bearing annular members 800 may be of the same shape and configuration and made of the same material as the cylindrical sidewall 254, 256, except that the interior load-bearing annular members 800 may be smaller (e.g., smaller diameter) so as to be able to fit within the interior cylindrical cavities 258, 260 defined by the cylindrical sidewalls 254, 256. In an alternative embodiment, one or more of the plurality of load-bearing annular members 800 may extend less than a continuous 360 degrees about the rotational axis 300 of the tire 200, but should still be arranged and constructed to provide sufficient run-flat support for the tire 200 during a deflated tire condition. In some alternative embodiments, one or more of the plurality of load-bearing annular members 800 may have a non-circular cross-section. For example, one or more of the plurality of load-bearing annular members 800 disposed within the cylindrical sidewalls 254, 256 may be provided with, for example, an oval-shaped cross-section, a triangle cross-section, a trapezoidal cross-section, or another polygonal cross-section. Importantly, for such multi-chamber insert embodiments, the number, shape, size, and arrangement of the interior load-bearing annular members 800a-n disposed within the interior cylindrical cavities 258, 260 defined by the cylindrical sidewalls 254, 256 should provide sufficient run-flat support for the tire 200 in a deflated condition.

The interior load-bearing annular members 800a-n may each define a chamber 806a-n that is reinforced with a filler material (e.g., foam, air, etc.). The filler material may be, for example, a polyethylene foam. Stated another way, a reinforcing material may be disposed within each chamber 806a-n to provide run-flat support for the tire 200 in a deflated condition. The number of chambers "a" through "n" can be any number. The filler material disposed within the chamber 806a-n may also (like the cylindrical sidewalls 254, 256 and, in some embodiments, the filler material disposed within the cylindrical cavities 258, 260) extend a continuous 360 degrees about the rotational axis 300 of the tire 200. In an alternative embodiment, the filler material may be disposed within the chamber 806a-n so as to extend less than 360 degrees about the rotational axis 300 (FIG. 3) of the tire 200.

Figure 10:
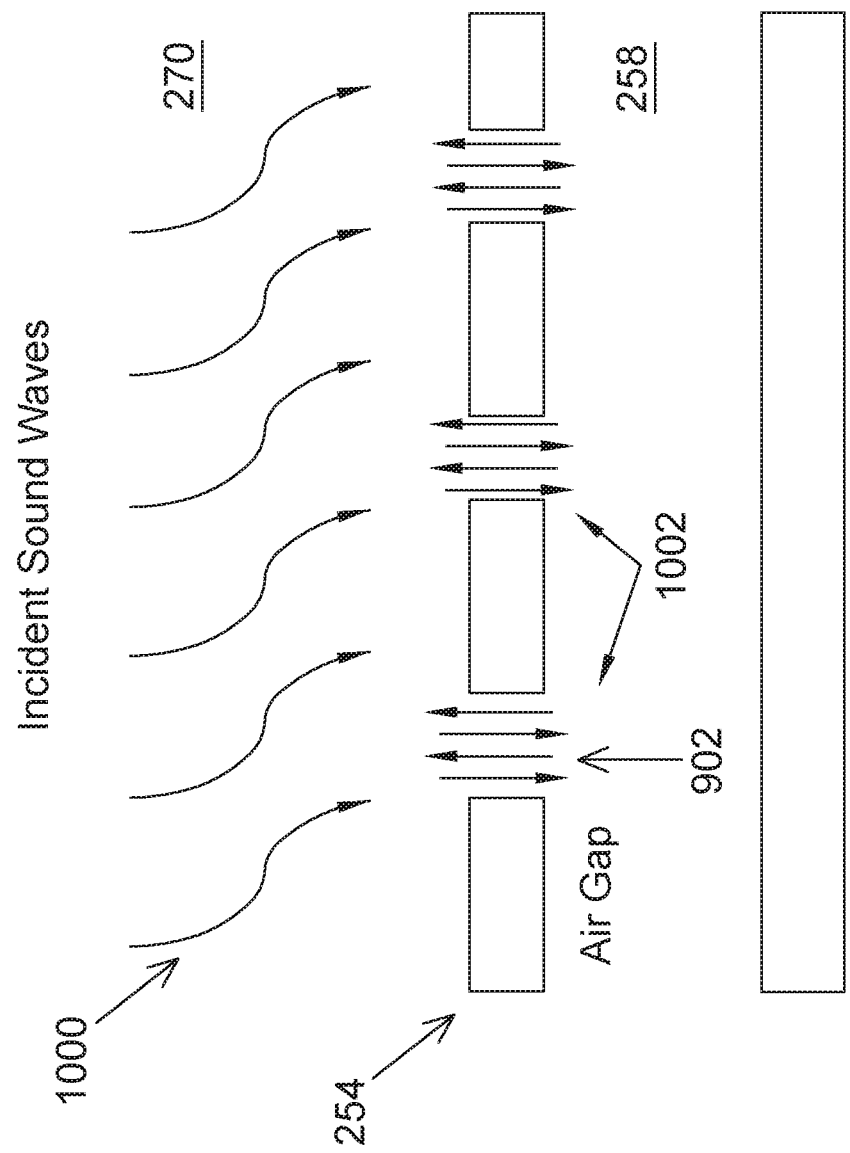
FIG. 10 is a schematic diagram of Helmholtz resonance in accordance with an embodiment of the present invention.

Referring now primarily to FIGS. 9 and 10, with reference also to FIGS. 2-3, the inventive post-cure inserts of the present invention may be formed as a pair of post-cure noise reduction inserts 900. In some embodiments, the post-cure noise reduction inserts 900 may also provide run-flat support, as with the inserts 218, 220. In such embodiments, the description herein above with respect to the post-cure run-flat inserts 218, 220 may also be applied to the post-cure noise reduction inserts 900, which will be described in more detail herein below. In other words, some embodiments of the present invention provide for post-cure inserts operable as a noise reduction apparatus and, simultaneously, as a run-flat insert. That said, it should be understood that, in some alternative embodiments of the present invention, the post-cure noise reduction inserts 900 may be provided primarily for tire cavity noise reduction purposes and may not be simultaneously operable as a run-flat insert sufficient to provide run-flat support for the tire 200 in a deflated conditions (as with the inserts 218, 220). Also, although FIG. 9 depicts a single post-cure noise reduction insert 900, it is understood that the tire 200 should be provided with the pair of post-cure noise reduction inserts 900, each constructed identically to one another and disposed within the inner tire region between the shoulder region 242, 244 and the respective upper sidewall region 246, 248 of the tire 200, as described above with respect to the post-cure run-flat inserts 218, 220.

In one embodiment, each of the pair of post-cure noise reduction inserts 900 may disposed entirely within an upper 50% of the respective sidewall region. In other words, each of the pair of post-cure noise reduction inserts 900 may not extend below the upper 50% of the respective sidewall region. In another embodiment, each of the pair of post-cure noise reduction inserts 900 is disposed entirely within an upper 40% of the respective sidewall region. In one embodiment, each of the pair of post-cure run-flat inserts 900 may be secured to the tire 200 so as to lie substantially above the plane, P. As used herein the term, "substantially above" means that at least 85% of the diameter 239 of each of the pair of post-cure run-flat inserts 218, 220 lies substantially above the plane, P.

The diameter 239 of each of the pair of post-cure noise reduction inserts 900 will naturally vary with the tire size and application load. In a preferred embodiment, each of the pair of post-cure run-flat inserts 218, 220 is sized and configured to operate as a wedge between an inflated tire section height and an uninflated tire section height at a loaded condition. Accordingly, the diameter 239 of each of the pair of post-cure noise reduction inserts 900 should be between 25% and 35% of the inflated tire section height in a loaded condition. As used herein, the term "between" is intended to be inclusive of the outer range limits.

Each of the pair of post-cure noise reduction inserts 900 can be considered an annular member extending 360 degrees. When disposed within the tire 200 in an operational configuration of the tire 200, each of the pair of the post-cure noise reduction inserts 900 is disposed so as to extend 360 degrees about the rotational axis 300 of the tire 200.

In one embodiment, each of the pair of post-cure noise reduction inserts 900 has a circular cross-section 250, 252 and is formed as a hose or a tubular member. Stated another way, each of the pair of post-cure noise reduction inserts 900 may include the cylindrical sidewall 254, 256 defining the interior cylindrical cavity 258, 260. For each of the pair of post-cure noise reduction inserts 900, the cylindrical sidewall 254, 256 and the interior cylindrical cavity 258, 260 may extend continuously 360 degrees about the rotational axis 300 of the tire 200, as shown in FIG. 3.

The cylindrical sidewall 254, 256 may be made of a polymer-based material. In one embodiment, the cylindrical sidewall 254, 256 may be made of a rubber material. In a further embodiment, the cylindrical sidewall 254, 256 may be constructed similar to a fire hose. In one embodiment, the cylindrical sidewall 254, 256 is made of a rigid or semi-rigid material. In one embodiment, the cylindrical sidewall 254, 256 may be made of a plastic polyvinyl chloride (PVC) material. In further embodiments, the cylindrical sidewall 254, 256 may be made of a rigid to semi-rigid PVC material.

Each of the pair of post-cure noise reduction inserts 900 may be secured to the radially inner surface 262 of the inner liner 212 during the normal inflation condition of the tire 200. In a preferred embodiment, the pair of post-cure noise reduction inserts 900 are secured to the radially inner surface of the inner liner 212 by the adhesive material 264. More specifically, the cylindrical sidewall 254, 256 may be secured to the radially inner surface 262 of the inner liner 212 by the adhesive material 264. In one embodiment, at least a portion of the exterior surface 266 of each of the cylindrical sidewalls 254, 256 is secured to the radially inner surface of the inner liner 212 by the adhesive material 264.

Figure 13:
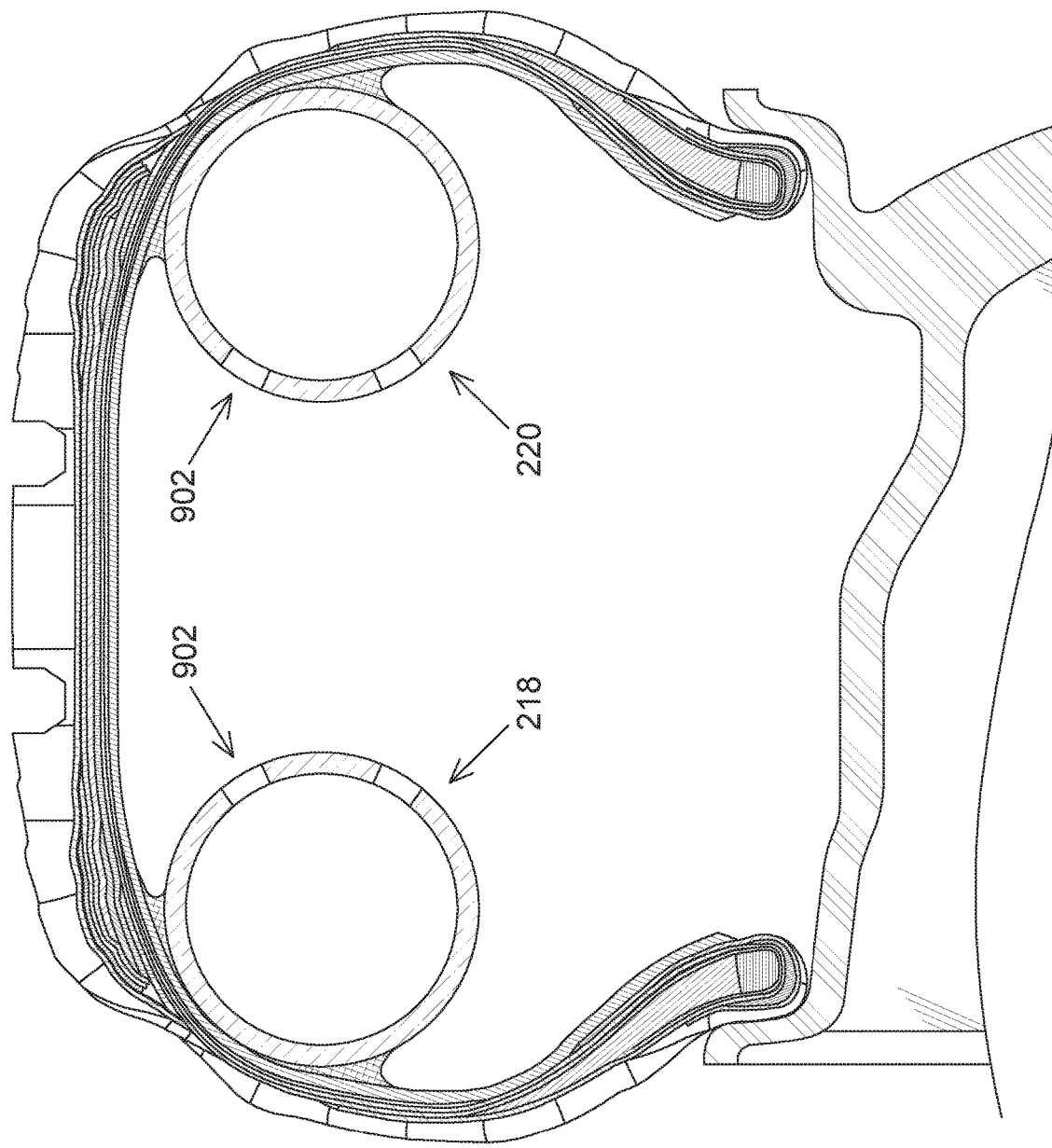
FIG. 13 a cross-sectional view of yet another exemplary embodiment of a pneumatic tire, illustrating a plurality of apertures disposed only on the tire cavity facing portion of the inserts so as to reduce tire cavity noise, in accordance with the present invention.

In a further embodiment, the cylindrical sidewall 254, 256 may define the plurality of apertures 902 (see FIG. 12). In such an embodiment, and as can be seen in FIG. 12, at least a portion of the adhesive material 264 may also extend into the interior cylindrical cavities 258, 260 and may adhere to at least a portion of the interior surface 268 of each of the cylindrical sidewalls 254, 256 so to provide additional dual-sided adhesion of the cylindrical sidewalls 254, 256 to the inner liner 212. In another embodiment, the apertures 902 may be defined only on the tire-cavity facing portion of the inserts 218, 220 and may only extend across 33% of the surface area of each of the inserts 218, 220, as depicted in FIG. 13. In a further embodiment, the apertures 902 may extend across at most 33% of the surface area of each of the inserts 218, 220. In yet a further embodiment, the apertures 902 may extend across at most 40% of the surface area of each of the inserts 218, 220. In addition, in embodiments in which the inserts 900 define the plurality of apertures 902, the inserts 900 may not be reinforced with filler materials, such as foam rubber or the annular members 800, so as to allow air/fluid to flow into and outside of the hollow inserts 900 through the apertures 902.

The adhesive material 264 may be considered a permanent or semi-permanent adhesive material 264. The adhesive material 264 should provide sufficient adhesion of the inserts 900 to the radially inner surface 262 of the inner liner 212 over the normal operational life of the tire 200, as well as, sufficient adhesion to secure the inserts 900 to the radially inner surface 262 during the zero psi state. In one embodiment, the adhesive material 264 may be a rubber gum. In a further embodiment, the adhesive material 264 may be a rubber gum that is similar to or identical to a cushion gum layer that is conventionally an uncured rubber-containing composition that, upon curing, mates new tread to the tire casing, during a retreading processes. The cushion gum layer is typically extruded in its uncured form and subsequently applied to the surface to be adhered. In another embodiment, the adhesive material 264 may be a rubber cement composition. In yet other embodiments, the adhesive material 264 may be formed as other types of adhesive compositions.

In alternative embodiments, each of the pair of post-cure noise reduction inserts 900 may be secured to the radially inner surface 262 of the inner liner 212 by other materials or structures. Importantly, each of the pair of post-cure noise reduction inserts 900 should be secured to the radially inner surface 262 so as to not become detached from the main tire body 201 during normal tire use.

As is known in the art, tire cavity noise is a noise produced in a vehicle cabin when resonance in the tire cavity produced by unevenness on road surface causes the wheels to vibrate, and this vibration is transmitted to the vehicle body via the suspension. The resonance frequency (or natural frequency) of a tire is a function of its circumference. Tire cavity noise is considered an undesirable nuisance and considerable effort has been made in the prior art to reduce this noise. In particular, consumer demand for a quiet riding experience is very high. Such prior art efforts to reduce tire cavity noise may provide positive results, in terms of actually reducing tire cavity noise. On the other hand, many prior art solutions also have negative consequences in their practical applications, including, but not limited to, increasing the overall weight of the tire, lacking in mountability to the tire, lacking in uniformity, deterioration in rotational balance, bad handling, and/or increasing the difficulty of the tire manufacturing process. Accordingly, embodiments of the present invention provide an improved noise reduction apparatus that overcomes at least some or all of these drawbacks.

The pair of post-cure noise reduction inserts 900 reduces a size of a tire cavity 270 of the tire 200, thereby reducing the sound waves produced via the tire 200. As used herein, the tire cavity 270 is considered a subset of the inner tire region 240. More specifically, while the inner tire region 240 is considered the entire area defined by the radially inner surfaces of the main tire body 201 that is sealed by a rim of a wheel, the tire cavity 270 is considered the portion of the inner tire region 240 that is external to the pair of post-cure noise reduction inserts 900. Even more specifically, the tire cavity 270 is considered the portion of the inner tire region 240 that is external to the exterior surface 266 of each of the cylindrical sidewalls 254, 256. In other words, as used herein, the tire cavity 270 of the tire 200 is the inner tire region 240 minus the volume occupied by the pair of post-cure noise reduction inserts 900 (including the interior cylindrical cavities 258, 260 defined by the cylindrical sidewalls 254, 256). As can be seen in FIG. 2, placement of the pair of post-cure noise reduction inserts 900 within the inner tire region 240 reduces the size/volume of the tire cavity 270. By reducing the size of the tire cavity 270, the post-cure noise reduction inserts 900 reduces the sound waves generated within the tire cavity 270 so as to reduce tire cavity noise.

In a further embodiment, each of the pair of post-cure noise reduction inserts 900 is formed as a Helmholtz resonator. The exterior surface 266 of each of the cylindrical sidewalls 254, 256 may define the plurality of apertures 902, which allow air to flow through so as to keep the tire cavity pressure and the pressure of the air volume within the sidewalls 254, 256 approximately the same. In other words, all or at least a portion of the apertures 902 may place the interior cylindrical cavities 258, 260 in fluid communication with the tire cavity 270. The plurality of apertures 902 may be dimensioned and spaced-apart from one another to generate out-of-phase acoustic waves that are operable to destructively interfere with incident acoustic tire cavity waves. As is known in the art, Helmholtz resonance frequency may be determined by factors such as a volume and length of an air chamber of the Helmholtz resonator, the dimensions of the one or more holes that allow air to pass into and out of the air chamber(s), etc. Accordingly, the dimensions and positioning of the apertures 902, and the dimensions of the cylindrical sidewalls 254, 256 that define the apertures 902 should be selected precisely in relation to the tire to generate acoustic waves that would destructively interfere with the incident acoustic tire cavity waves so as to reduce tire cavity noise.

In one embodiment, the apertures 902 may be defined only on the tire-cavity facing portion of the inserts 218, 220 and may only extend across 33% of the surface area of each of the inserts 218, 220, as depicted in FIG. 13. In addition, the inserts 900 may not be reinforced with filler materials, such as foam rubber or the annular members 800, so as to allow air/fluid to flow into and outside of the tire cavity 270 through the apertures 902 in order to reduce tire cavity noise.

FIG. 10 illustrates an exemplary operation of each of pair of post-cure noise reduction inserts 900 as a Helmholtz resonator, in a schematic view. Incident sound waves 1000 from within the tire cavity 270 can travel to the apertures 902 defined by the cylindrical sidewall 254. The sound waves 1000 can travel into the interior cylindrical cavity 258 creating a Helmholtz resonance affect. The reflected sound waves 1002 resulting from pressure gradients at the interface (apertures 902) between the tire cavity 270 and the interior cylindrical cavity 258 should produce a destructive interference that decreases the amplitude of the incident sound waves 1000, thereby reducing the overall tire cavity noise of the tire 200.

Figure 11:
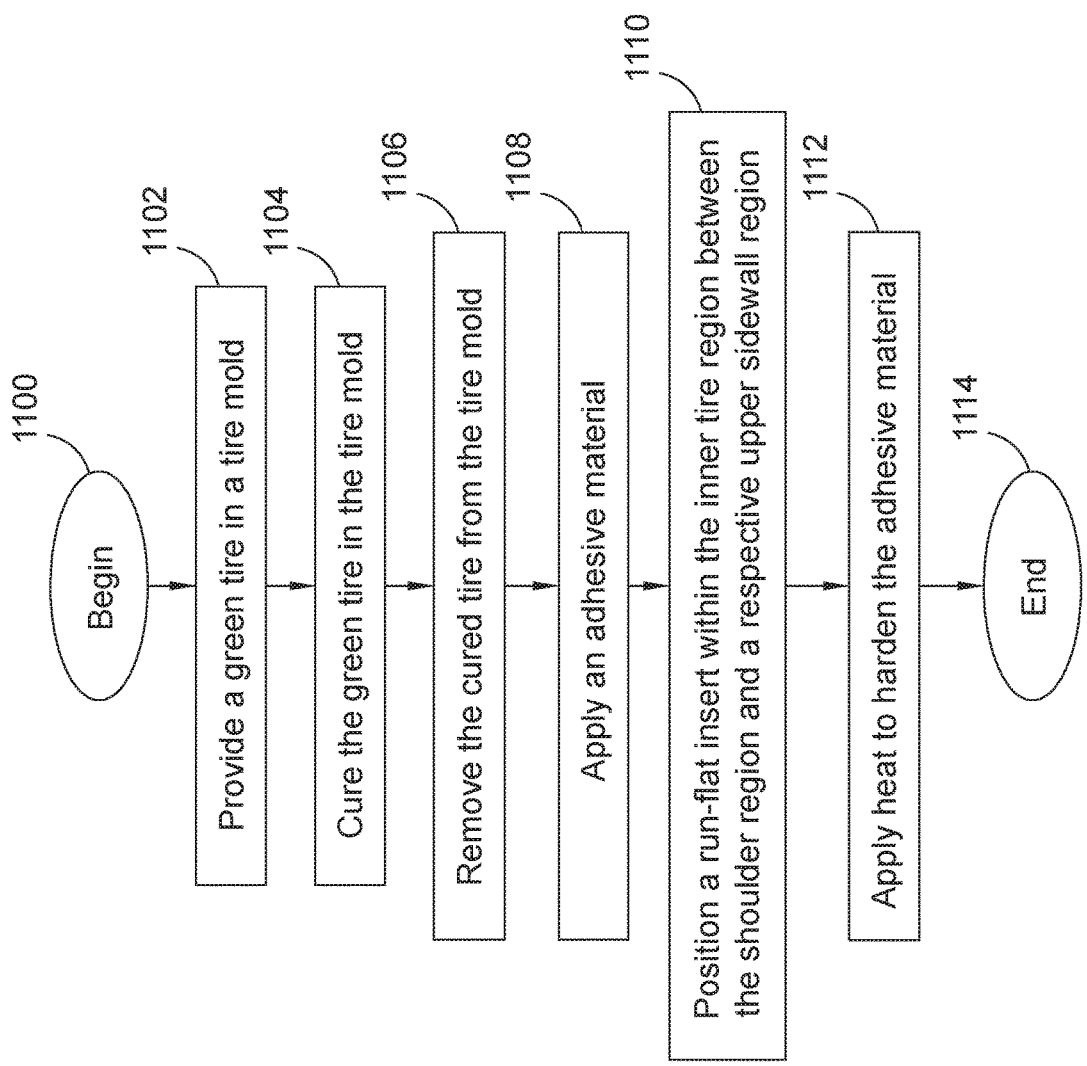
FIG. 11 is a block diagram view of a process flow chart of an exemplary manufacturing process, in accordance with the present invention.

In one embodiment, each of the plurality of apertures 902 may be equally spaced apart from another. In another embodiment, the plurality of apertures 902 may be spaced apart from one another so as to provide a uniform spacing pattern across the circumference of the post-cure noise reduction inserts 900. Stated another way, the plurality of apertures 902 may be dimensioned and spaced-apart from one another according to a uniform pattern that extends continuously 360 degrees about the rotational axis 300 of the tire 200. In a preferred embodiment, each of the plurality of apertures 902 may be formed with a circle-opening 904 having a ⅛ inch diameter 906 and being disposed a distance 908 of 1.0 inches apart from one another. In another embodiment, each of the plurality of apertures 902 may be formed with a circle-opening having a diameter that is greater than or less than ⅛ inches. In yet another embodiment, each of the plurality of apertures 902 may be spaced apart from one another greater than or less than 1.0 inches. As explained above, the precise dimensions of the apertures 902 and the spacing of the same may depend on the tire dimensions and other related tire properties, but should generate reflective sound waves 1000 that destructively interfere with the incident acoustic tire cavity waves so as to reduce tire cavity noise Referring now primarily to the process flow chart depicted in FIG. 11, with reference to FIG. 2, an exemplary method of manufacturing the tire 200 of the present invention is described. Although FIG. 11 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 11 for the sake of brevity. In some embodiments, some or all of the process steps included in FIG. 11 can be combined into a single process.

The exemplary process may begin at step 1100 and immediately proceed to step 1102, where a green tire is provided in a tire mold. In one embodiment, before the green tire is placed in the tire mold, the green tire may be formed by individually applying tire components at a tire building machine (TAM) with a tire building drum, as disclosed by U.S. Pat. No. 6,488,797, incorporated herein by reference. In one embodiment, the green tire that is formed at the TAM and provided in the tire mold is a run-flat tire with a sidewall-reinforcing insert. In such embodiments, the post-cure run-flat inserts 218, 220 may provide additional run-flat support.

In a preferred embodiment, the green tire that is formed at the TAM and subsequently placed in the tire mold for curing is a conventional non-run-flat tire, without a sidewall-reinforcing insert. In such embodiments, the post-cure run-flat inserts 218, 220 are configured so as to provide run-flat support for the conventional non-run-flat tire. Accordingly, conventional non-run-flat tire manufacturing processes can be used to construct the tire 200 pre-cure; yet, after the green tire is cured run-flat support can be provided via placement of the post-cure run-flat inserts 218, 220 on the cured tire.

In step 1104, the green tire is cured in the tire mold, per normal tire manufacturing curing processes and equipment. In step 1106, the cured tire is removed from the tire mold. After removing the cured tire from the tire mold, in step 1108, the adhesive material 264 may be applied to the radially inner surface 262 of the inner liner 212 and/or the exterior surface 266 of each of the pair of post-cure inserts 218, 220 (or 900). In alternative embodiments, the post-cure inserts 218, 220 (or 900) may be secured to the tire 200 by other materials or structures.

In step 1110, after the cured tire is removed from the tire mold, the post-cure inserts 218, 220 (or 900) may be positioned within the inner tire region 240 between the shoulder region 242, 244 and the respective upper sidewall region 246, 248 of the tire 200. The exterior surface 266 of each of the post-cure inserts 218, 220 (or 900) should be secured to the radially inner surface 262 of the inner liner 212 between the shoulder region 242, 244 and the respective upper sidewall region 246, 246 and may extend continuously 360 degrees along a circumference of the tire 200.

Referring now briefly to FIG. 12, in conjunction with the flow-chart of FIG. 11, in one embodiment, the post-cure inserts 218, 220 (or 900) may be provided with the plurality of apertures 902 and, in step 1112, heat may be applied to the adhesive material 264 sufficient to cause a flow of the adhesive material 264 through at least a portion of the plurality of apertures 902 and to simultaneously harden the adhesive material 264 so as to further secure the pair of post-cure inserts 218, 220 (or 900) to the inner liner 212. The process may immediately end at step 1114.

A novel and efficient post-cure tire insert has been disclosed that can be applied after a green tire is cured and may provide post-cure run-flat support and/or tire cavity noise reduction.

What is claimed is:

1. A run-flat tire comprising:
  a. a pair of post-cure run-flat inserts, each of the pair of post-cure run-flat inserts:
    i. is disposed within an inner tire region between a shoulder region and a respective upper sidewall region of a tire;
    ii. extends 360 degrees about a rotational axis of the tire;
    iii. has a circular cross-section;
    iv. is secured to a radially inner surface of an inner liner during a normal inflation condition of the tire, the pair of post-cure run-flat inserts is configured to provide run-flat support when the normal inflation condition changes to a zero inflation pressure state of the tire; and v. includes a cylindrical sidewall defining an interior cylindrical cavity, each of the cylindrical sidewall and the interior cylindrical cavity extending 360 degrees about the rotational axis of the tire, the cylindrical sidewall including a plurality of apertures, the plurality of apertures being arranged to place the interior cylindrical cavity in fluid communication with a tire cavity of the run-flat tire.

2. The run-flat tire in accordance with claim 1, wherein:
a. the cylindrical sidewall has an exterior surface that is secured to the radially inner surface of the inner liner during the normal inflation condition of the tire by an adhesive material.

3. The run-flat tire in accordance with claim 2, further comprising:
a. a tread, the inner liner disposed beneath the tread;
b. a first bead portion and a second bead portion axially spaced apart from one another, each bead portion having a bead core and a bead filler; and
c. at least one body ply:
   i. having a main body ply portion extending circumferentially about the tire, at least a portion of the main body ply portion disposed between the tread and the inner liner; and
   ii. having a first turned-up portion and a second turned-up portion, the first turned-up portion looping around the first bead portion and the second turned-up portion looping around the second bead portion.

4. The run-flat tire in accordance with claim 3, wherein:
a. the cylindrical sidewall is comprised of a polymer material.

5. The run-flat tire in accordance with claim 1, wherein each of the pair of post-cure run-flat inserts includes a foam material disposed within the interior cylindrical cavity defined by the cylindrical sidewall, the foam material being at least one of:
a. a closed-cell foam material,
b. a polyethylene foam material, and
c. a foam rubber.

6. The run-flat tire in accordance with claim 1, further comprising:
a. air disposed within the interior cylindrical cavity defined by the cylindrical sidewall.

7. The run-flat tire in accordance with claim 1, further comprising:
a. a plurality of interior load-bearing annular members disposed within the interior cylindrical cavity defined by the cylindrical sidewall, each of the plurality of interior load-bearing annular members having a diameter that is smaller than a diameter of the cylindrical sidewall.

8. The run-flat tire in accordance with claim 7, wherein:
a. the diameter of each of the plurality of interior load-bearing annular members is no more than ½ the diameter of the cylindrical sidewall.

9. The run-flat tire in accordance with claim 7, wherein:
a. each of the plurality of interior load-bearing annular members extends 360 degrees about the rotational axis of the tire and has a circular cross-section.

10. The run-flat tire in accordance with claim 2, wherein:
a. the cylindrical sidewall is reinforced with wire.

* * * * *